Patented Mar. 10, 1953

2,631,176

UNITED STATES PATENT OFFICE 2,631,176

PRODUCTION OF HIGH VISCOSITY OLEFIN POLYMERS

Raymond L. Heinrich, Baytown, Tex., assignor, by mesne assignments, to Standard Oil Development Company, Elizabeth, N. J., a corporation of Delaware No Drawing. Application September 12, 1947, Serial No. 773,733

8 Claims. (Cl. 260—683.15)

The present invention is directed to a method for producing high viscosity polymers. More particularly, the invention is directed to the production of synthetic lubricating oils having high viscosities.

In the production of a polymer having lubricating oil qualities, it is customary to polymerize olefins having the double bond in the alpha position. Olefins having double bonds in the beta position generally are unsuitable for the production of polymers having lubricating oil qualities. The polymerization is ordinarily conducted at substantially atmospheric temperature; however, temperatures slightly above atmospheric temperatures have been employed and when it is desired to produce polymers having high molecular weight and, therefore, high viscosities, it is necessary to reduce the temperature substantially below atmospheric temperature. Employment of reduced temperatures requires the provision of expensive refrigeration equipment.

In the prior art processes, it has also been considered that the presence of oxygenated organic compounds, such as ketones, peroxides, and alcohols, were deleterious to the reaction when it was desired to polymerize olefinic materials. For example, in the polymerization of mono-olefins, such as isobutylene, with diolefins such as isoprene at low temperatures to produce a high molecular weight polymer suitable as a synthetic rubber, it is necessary to remove substantially all of the oxygenated compounds from the reactant material; otherwise, if the oxygenated organic compounds are not removed, the catalyst activity, usually a Friedel-Crafts type catalyst is employed, would be seriously impaired and the catalyst ultimately destroyed by contact with the oxygenated compounds. Not only is this true in the low temperature polymerization of olefins to produce high molecular weight polymers suitable as synthetic rubber, but this also holds true in the case of polymerization of alpha mono-olefins for producing polymers having lubricating oil characteristics. Thus, it has been necessary to provide expensive purification procedures to remove oxygenated organic compounds from alpha olefins.

Alpha olefins are usually formed in conjunction with oxygenated organic compounds in the hydrogenation of carbon monoxide to hydrocarbons and oxygenated compounds in the so-called Fischer-Tropsch synthesis; thus, while the process produces valuable starting materials for the polymerization of alpha mono-olefins suitable as a lubricating oil polymer, it also produces compounds which are deleterious to the reaction.

It is, therefore, an object of the present invention to provide a process for producing high viscosity lubricating oil polymers by polymerization of alpha olefins.

The objects of the present invention may be achieved by polymerizing a substantially pure alpha olefin in the presence of a Friedel-Crafts type of catalyst by adding to the reactants a small quantity of an oxygenated organic compound.

Briefly, the present invention involves the polymerization of an alpha mono-olefin by forming a reaction mixture of an alpha mono-olefin and a Friedel-Crafts type catalyst, such as illustrated by aluminum chloride, and agitating the mixture at a temperature in the range from about 75° to 250° F. for a time sufficient to form a polymer of the desired lubricating oil characteristics. Prior to or after the initiation of the polymerization reaction, a small quantity of an oxygenated organic compound, not exceeding about 5 weight per cent based on the alpha mono-olefin, is added to the reaction mass.

As mentioned before, the reaction temperatures may be in the range from about 75° to 250° F. Ordinarily, it will be desired to employ temperatures in the lower portion of the range, for example, temperatures of about 75° to 150° F. will be preferred. Pressures employed may be sufficient to maintain the hydrocarbon reactant in the liquid phase. This will depend, of course, on the type of olefin to be employed. For example, when butene-1 is employed as the feed stock, it may be desirable to superimpose a pressure on the system sufficient to maintain the hydrocarbon in a liquid phase. When pentene-1 and higher hydrocarbons of the same homologous series are employed as a feed stock, the pressure will also be dependent upon the reaction temperature employed and the boiling point of the hydrocarbon reactant, but in any case should be sufficient to maintain the liquid phase.

As mentioned before, the feed stock should be an alpha mono-olefin. As illustrative of the alpha mono-olefins which may be used may be mentioned butene-1, pentene-1, hexene-1, heptene-1, octene-1, nonene-1 and decene-1. Higher members of the same homologous series may be used, but some difficulty may be encountered in purifying the alpha mono-olefin from the other olefins having the same number of carbon atoms.

The oxygenated organic compounds employed in the present invention will include the aliphatic alcohols, such as methyl, ethyl, isopropyl, propyl, the butyl alcohols, and the other members of the same homologous series. The ketones, such as acetone, methyl ethyl ketones, and various other members of the same series may be employed. Peroxides such as di-isopropyl peroxide, benzoyl peroxide and the like may also be used in the present invention. It may also be desirable to employ the aldehydes, such as acetaldehyde, benzaldehydes and the organic acids as illustrated by formic acid, oxalic acid, or benzoic acid.

In order to illustrate further the beneficial aspects of the present invention, comparative runs were made in which decene-1 was polymerized in the presence of aluminum chloride as a catalyst. The decene-1 was admixed in equal volumes with normal heptane as a diluent prior to polymerization. One run was made without methanol and another run was made in which methanol was added after the run had been initiated. After the polymerization had been completed, the product was separated from the catalyst and the product was distilled to recover a polymer boiling in the lubricating oil boiling range.

In the following table are given the conditions under which these two runs were conducted and the results of the inspection characteristics of the polymer separated from the reaction product:

Table I

|  | Run 1 | Run 2 |
|---|---|---|
| Charge: |  |  |
| Vol. percent decene-1 | 50 | 50 |
| Vol. percent n-heptane | 50 | 50 |
| Methanol Added, Wt. percent of decene-1 | 0 | 2 |
| Aluminum Chloride, Wt. percent of decene-1 | 4 | 4 |
| Reaction Temperature, °F | 100 | 100 |
| Reaction Time, Hours | 2 | 2 |
| Polymer Yield, Wt. percent of decene-1 | 86.6 | 73.0 |
| Tests on Polymer: |  |  |
| Viscosity at 100° F., S. S. U | 699 | 2,598 |
| Viscosity at 210° F., S. S. U | 88.6 | 232 |
| Viscosity Index | 124 | 122 |

It will be seen from the foregoing inspection data that the viscosity at 210° F. of the polymer boiling in the lubricating oil boiling range was almost trebled and the viscosity at 100° F. was almost quadrupled by the inclusion of 2% by weight of methanol based on the decene-1 charged to the reaction.

Another series of runs were made in which decene-1 in equal volumes with normal heptane was polymerized with aluminum chloride catalyst at a temperature of about 151° F. In one run, the feed stock comprised essentially decene-1, and normal heptane. In the second run, the feed stock included peroxides and in the third run the feed stock included both peroxides and methyl n-amyl ketone. In the runs in which peroxides were present, they were formed in situ by reaction of atmospheric or dissolved oxygen with the decene-1. The reaction was allowed to go to completion and the product was separated from the catalyst; the product was then distilled to recover a polymer in the lubricating oil boiling range. The viscosities of the polymers produced in the three runs were determined. The conditions under which the runs were conducted and inspection characteristics of the product in the lubricating oil boiling range are tabulated below:

Table II

|  | Run 3 | Run 4 | Run 5 |
|---|---|---|---|
| Charge: |  |  |  |
| Vol. percent Decene-1 | 50 | 50 | 50 |
| Vol. percent Heptane | 50 | 50 | 50 |
| Methyl-n-Amyl Ketone, Wt. percent of Decene-1 | None | None | 3.7 |
| Didecyl Peroxides, Wt. percent of Decene-1 | 0.01 | 0.63 | 0.63 |
| AlCl₃ catalyst, Wt. percent of Decene-1 | 0.7 | 2.7 | 8.0 |
| Reaction Temp., °F | 151 | 151 | 152 |
| Reaction time, Hours | 2 | 2 | 2 |
| Polymer Yield, Wt. percent of Decene-1 | 85 | 89 | 93 |
| Tests on Polymer: |  |  |  |
| Vis. 100° F., S. S. U | 189 | 980 | 1,900 |
| Vis. 210° F., S. S. U | 49.1 | 116 | 181 |
| Viscosity Index | 134 | 127 | 123 |

It will be apparent from the foregoing data in Table II that the presence of peroxides increased the viscosity of the polymer from 189 seconds at 100° F. to 980 seconds, and from a viscosity at 210° F. of 49 seconds to 116 seconds, whereas the presence of both the ketone and peroxide increased the viscosity at 100° F. from 189 seconds to 1900 seconds, which is nearly ten-fold, and from a viscosity at 210° F. of 49 seconds to 181 seconds. It is also noteworthy that the viscosity indexes of the polymer produced in the presence of both the peroxides and ketones and peroxides alone were not seriously affected. It will be apparent that the present invention allows the control of the quality of the product by varying the quantity of the oxygenated organic compound added to the reaction mixture. It is also apparent that the quality of the product may be varied considerably by varying the type of oxygenated organic compound added to the reactants. Thus, if one product is desired, it may be desirable, in accordance with the present invention, to add a particular oxygenated organic compound, whereas if one of higher viscosity is desired then another type of oxygenated organic compound will be added. While the present invention preferably involves the addition of controlled amounts of oxygenated organic compounds of particular types to the alpha olefin undergoing polymerization, it is within the spirit and scope of the invention to reduce the oxygenated organic content of alpha olefin derived from the hydrogenation of carbon monoxide to a concentration in the range given, polymerize this mixture and thus control the quality of the lubricating oil polymer resulting therefrom.

The invention has been described and illustrated by examples in which aluminum chloride has been used as a catalyst. It is within the purview of my invention to employ other Friedel-Crafts type catalysts as, for example, boron trifluoride, aluminum bromide, aluminum fluoride, ferric chloride, ferric bromide, and other similar catalysts in lieu of aluminum chloride.

While it is preferred to employ a substantially pure alpha olefin, the alpha olefin may be employed in mixtures with other hydrocarbons, such as paraffinic hydrocarbons, which may serve as a diluent for the reaction as shown in the examples. On the other hand, while the straight chain alpha olefins are preferred as the feed stock, the straight chain alpha olefins may be employed in mixtures with alpha olefins of branch structure.

The nature and objects of the present invention having been completely described and illustrated, what I wish to claim as new and useful and secure by Letters Patent is:

1. A method for producing an olefin polymer which includes the steps of subjecting an alpha mono-olefin having at least 4 carbon atoms in the molecule to polymerization in the presence of aluminum halide catalyst at a temperature in the range between 75° and 250° F., adding to the alpha olefin during polymerization thereof a small amount of an oxygenated organic compound selected from the class consisting of alcohols, ketones, peroxides, aldehydes and organic acids not exceeding 5 weight per cent of the olefin being polymerized to form a product, said aluminum halide being employed in an amount greater than the amount of oxygenated organic compound, separating the product from the catalyst and recovering from the product a polymer having a high viscosity and lubricating oil characteristics.

2. A method of producing a synthetic lubricating oil which includes the steps of forming a mixture of decene-1 and normal heptane in equal volumes, adding to the mixture a small amount of an oxygenated organic compound selected from the class consisting of alcohols, ketones, peroxides, aldehydes and organic acids not exceeding 5% by weight of the decene-1, subjecting the mixture containing oxygenated organic compound to polymerization with aluminum chloride as catalyst at a temperature in the range from about 75° to 175° F. for about two hours to form a product, separating the product from the catalyst and recovering a high viscosity polymer having lubricating oil properties from the product.

3. A method for controlling the viscosity of olefin polymer which includes the step of subjecting a mixture of an alpha olefin and a small amount of an oxygenated organic compound selected from the class consisting of alcohols, ketones, peroxides, aldehydes and organic acids not exceeding 5% of the olefin to polymerization in the presence of an active metal halide catalyst at a temperature in the range between 75° and 250° F. to form a product including a high viscosity polymer having lubricating oil characteristics, said active metal halide catalyst being employed in an amount greater than the amount of oxygenated organic compound.

4. A method for producing a lubricating oil having a high viscosity which includes the steps of forming a mixture of an alpha olefin and a small amount of an oxygenated organic compound selected from the class consisting of alcohols, ketones, peroxides, aldehydes and organic acids not exceeding 5 weight per cent of the olefin, subjecting the mixture to polymerization in the presence of an active metal halide catalyst at a temperature in the range between 75° and 150° F. to form a product including a high viscosity lubricating oil polymer, said active metal halide catalyst being employed in an amount greater than the amount of oxygenated organic compound, and recovering said high viscosity lubricating oil polymer.

5. A method for producing a synthetic lubricating oil which includes the steps of forming a mixture of decene-1 and normal heptane in equal volumes, adding to the mixture a small amount of an organic peroxide not exceeding 5 weight per cent of the decene-1, subjecting the mixture containing said organic peroxide to contact with aluminum chloride at a temperature in the range of about 75° to 175° F. for about two hours to form a product, separating the product from the aluminum chloride, and recovering a high viscosity polymer having lubricating oil properties from the product.

6. A method for controlling the viscosity of an olefin polymer having lubricating oil characteristics which includes the steps of subjecting an alpha olefin to polymerization in the presence of an active metal halide catalyst at a temperature in the range between 75° and 250° F. and adding to the alpha olefin during polymerization thereof a small amount of an oxygenated organic compound selected from the group consisting of alcohols, ketones, peroxides, aldehydes and organic acids not exceeding 5 weight per cent of the olefin polymerized, said metal halide catalyst being employed in an amount greater than the amount of oxygenated organic compound.

7. A method for controlling the viscosity of an olefin polymer having lubricating oil characteristics which comprises forming a mixture of an alpha mono-olefin and a normal paraffinic hydrocarbon, subjecting the mixture to polymerization in the presence of an active metal halide catalyst at a temperature in the range between 75° and 250° F. and adding to the mixture during the polymerization thereof a small amount of an oxygenated organic compound selected from the group consisting of alcohols, ketones, peroxides, aldehydes and organic acids not exceeding 5 weight per cent of the alpha mono-olefin being polymerized, said metal halide catalyst being employed in an amount greater than the amount of oxygenated organic compound.

8. A method for producing a high viscosity lubricating oil which comprises subjecting an alpha mono-olefin having no less than 4 and no greater than 10 carbon atoms in the molecule to polymerization in the presence of an active metal halide catalyst at a temperature in the range between 75° and 250° F., adding to the alpha olefin during polymerization thereof a small amount of an oxygenated organic compound selected from the group consisting of alcohols, ketones, peroxides, aldehydes and organic acids not exceeding 5 weight per cent of the alpha mono-olefin being polymerized, said metal halide catalyst being employed in an amount greater than the amount of oxygenated organic compound, forming a polymerized product, separating the product from the catalyst and recovering from the product a lubricating oil having a high viscosity.

RAYMOND L. HEINRICH.

REFERENCES CITED

The following references are of record in the file of this patent:

UNITED STATES PATENTS

| Number | Name | Date |
| --- | --- | --- |
| 2,076,201 | Langedijk et al. | Apr. 6, 1937 |
| 2,084,082 | Fitch | June 15, 1937 |
| 2,085,535 | Langedijk et al. | June 29, 1937 |
| 2,384,916 | Holmes | Sept. 18, 1945 |
| 2,397,146 | Kellogg | Mar. 26, 1946 |
| 2,416,461 | Stewart | Feb. 25, 1947 |
| 2,443,210 | Upham | June 15, 1948 |
| 2,450,451 | Schmerling | Oct. 5, 1948 |
| 2,490,578 | Carmody | Dec. 6, 1949 |

FOREIGN PATENTS

| Number | Country | Date |
| --- | --- | --- |
| 812,909 | France | May 20, 1937 |